United States Patent [11] 3,627,714

[72] Inventor Bernard A. Merkl
Detroit, Mich.
[21] Appl. No. 879,915
[22] Filed Nov. 25, 1969
[45] Patented Dec. 14, 1971
[73] Assignee BASF Wyandotte Corporation
Wyandotte, Mich.

[54] WATER-SOLUBLE POLYURETHANE-UREAS
22 Claims, No Drawings
[52] U.S. Cl. .................................................. 260/18 TN,
117/139.5 A, 260/29.2 TN, 260/77.5 AM,
260/77.5 C
[51] Int. Cl. ...................................................... C08g 22/14
[50] Field of Search ........................................... 260/29.2
IN, 77.5 AM, 77.5 AX, 77.5 AQ, 858; 117/139.5 A

[56] References Cited
UNITED STATES PATENTS
3,061,470 10/1962 Kuemmerer .................. 260/29.2
3,316,189 4/1967 Adams .......................... 260/858
3,401,133 9/1968 Grace et al. ................... 260/29.2

*Primary Examiner* — Donald E. Czaja
*Assistant Examiner* — Eugene C. Rzucidlo
*Attorneys* — Gerard G. Weil, Robert E. Dunn, Bernhard R. Swick, Joseph D. Michaels, Charles G. Lamb and Robert M. Phipps

ABSTRACT: Water-soluble urethane-urea polymers resistant to moisture absorption in humid atmospheres are prepared by reacting a blend of a polyoxyalkylene glycol and a polyoxyethylene adduct of polyoxypropylene glycol with an excess of organic polyisocyanates to form isocyanate-terminated prepolymers which are chain extended with an organic diamine. The water-soluble polymers are suitable for use as a coating in textile sizing operations, as a water-removable temporary protective coating and may be cast into films, extruded, injection molded and extrusion blow molded.

WATER-SOLUBLE POLYURETHANE-UREAS

This invention relates to water-soluble urethane-urea polymers and more particularly, to water-soluble urethane-urea polymeric coating compositions which are resistant to moisture absorption in humid atmospheres.

Various water-soluble urethane-urea polymer coating compositions have been employed in the prior art as coatings in textile sizing operations, temporary protective coatings, adhesives and the like. The prior art polymers possess certain inherent disadvantages which either limit or prevent their advantageous utilization.

Absorption of moisture in humid atmospheres by the prior art polymers with accompanying loss in the tensile strength, and their poor adhesion to fibrous and other materials make them unsuitable for many applications and particularly as coatings in textile sizing operations where humid atmospheres prevail.

In an effort to overcome these disadvantages, attempts have been made in the prior art to incorporate various additives in water-soluble urethane-urea polymers and to synthesize complex molecules of such polymers. However, such solutions have either proven unsatisfactory under practical operating conditions or are objectionably expensive for commercial applications.

Heretofore, starch has enjoyed the widest use in textile sizing applications but suffers from its poor adhesion to man-made fibers and from its contribution to stream pollution.

An object of the present invention is to provide inexpensive water-soluble urethane-urea polymers having improved resistance to moisture absorption in humid atmospheres. Another object is to provide water-soluble urethane-urea polymers which have excellent adhesive properties. A further object of the present invention is to provide materials which advantageously size and desize yarns and which do not contribute markedly to stream pollution. Still another object of the present invention is to provide water-soluble urethane-urea polymers which may be readily cast into films, extruded, injection molded and extrusion blow molded. The above and additional objects and advantages of this invention will be readily apparent to those skilled in the art from the following detailed description.

In accordance with the present invention, water-soluble urethane-urea polymers are prepared by reacting a blend of a water-soluble polyoxyalkylene glycol and a block copolymer, prepared by the addition of ethylene oxide to polyoxypropylene glycol, with a stoichiometric excess of an organic polyisocyanate in the presence of a catalyst and in the absence of a solvent to form a water-soluble prepolymer having terminal unreacted isocyanate groups, subjecting the prepolymer to partial curing to render it water-insoluble and chain-extending the prepolymer with an organic diamine or diamine carbamate. The chain-extended polymer resulting from this reaction is water-soluble.

Although the reaction of the blend of the water-soluble glycol and copolymer are preferably reacted with the organic polyisocyanate in the absence of a solvent, the same results may be obtained by carrying out the reaction in the presence of an inert solvent which is nonreactive with any of the reactant materials. Representative solvents which may be utilized are toluene, xylene and the like.

In preparing the urethane-urea polymers, the ratios of the reactive ingredients for preparing the prepolymer and of the organic diamine to the prepolymer must be closely controlled. In preparing the isocyanate-terminated prepolymer, the ratio of OH/NCO must be between 1.0:1.2 and 1.0:2.1 and preferably, between 1:1.5 and 1:1.9. At ratios greater than 1.0:1.2, the resulting prepolymers are susceptible to moisture and will completely solubilize under normal atmospheric conditions. At ratios less than 1.0:2.1 the resulting prepolymers are water insoluble. In chain extending the isocyanate-terminated prepolymer with the organic diamine, the ratio of $NCO/NH_2$ must be between 1.0:0.1 and 1.0:2.0 and preferably between 1.0:0.2 and 1.0:1.5. When ratios of $NCO/NH_2$ are greater than 1.0:0.1, water-insoluble urethane-urea polymers result, whereas weak polymers are produced if the ratio of $NCO/NH_2$ is less than 1.0:2.0.

In order to prepare the polyurethanes of this invention, it is necessary that the isocyanate-terminated prepolymer is partially cured prior to chain extending with diamines. It has been found that the more suitable prepolymers are water insoluble before being reacted with diamines. The polymers are converted to the water-insoluble state by curing until at least 20 percent and up to about 100 percent of the free isocyanate groups of the prepolymer have been reacted. The curing is accomplished by merely exposing the prepolymer to normal atmospheric conditions. For example, if the free isocyanate content of the prepolymer is 1.00 percent then it should be cured in the atmosphere until the free isocyanate content is below about 0.80 percent. If the free isocyanate concentration is not decreased by at least about 20 percent of its original concentration, the resulting prepolymer will still be water soluble and upon reacting with diamines the resulting polymer, when formed into films, has low tensile strength, is soft, and has a low melting point.

The polyoxyalkylene glycols used in this invention are water soluble. These glycols are generally prepared by the condensation of alkylene oxides, such as ethylene or propylene oxide or a blend of these oxides with a difunctional initiator such as water or a glycol, such as ethylene or propylene glycol. The resulting glycol is then chain extended to prepare a polyoxyalkylene glycol of predetermined molecular weight. Polyoxyethylene glycol is preferred since it is hydrophilic even at molecular weights as high as 1,000,000 to 5,000,000. Water-soluble polyoxypropylene glycols may also be employed individually or admixed with water-soluble polyoxyethylene glycols. The molecular weight of the polyoxyalkylene glycol should be at least 1,000 and preferably 3,000 to 12,000 or more, and most preferably, about 4,000 to 8,000. The block copolymer may be formed by the addition of ethylene oxide to polyoxypropylene glycol in any conventional manner. Preparation of this copolymer is described in U.S. Pat. No. 2,674,619. The copolymer employed in this invention must contain at least 50 percent by weight of the composition of ethylene oxide groups, and preferably from 50 percent to 80 percent by weight of said copolymer. The copolymer can have a molecular weight of from about 4,700 to 16,250. Preferably, the molecular weight should be about 6,000 to 9,000. The weight ratio of polyoxyethylene glycol to the block copolymer, prepared by the addition of ethylene oxide to polyoxypropylene glycol may vary from 3.0 to 10.0:1.0. Preferably, the ratio is from about 4.0 to 8.5:1.

Any suitable organic polyisocyanate may be used in practicing this invention. Aromatic, aliphatic, cycloaliphatic diisocyanates and combinations thereof are suitable. Examples of the more common diisocyanates are toluene diisocyanate, tetramethylene diisocyanate, 4,4'-diphenylmethane diisocyanate, 1,5-naphthalene diisocyanate, m-xylylene diisocyanate and methyl cyclohexane diisocyanate. Other representative organic diisocyanates include polyisocyanates disclosed in U.S. Pat. Nos. 2,292,443; 2,683,730; and 2,929,794. Mixtures of two or more of any of the organic polyisocyanates may be employed.

The diamines which may be used in the practice of this invention may be either primary or secondary diamines or combinations thereof. The diamines should have a melting point below the maximum temperature of the reaction for chain-extending the prepolymer by reaction with the diamine. Examples of these diamines are ethylene diamine, N-(2-hydroxypropyl) ethylene diamine, hexamethylene diamine, N-N'-(bis cyanoethyl)ethylene diamine and the like. Cyclic diamines such as 2-methylpiperazine, benzopiperazine, 2,6-dimethylpiperazine, and the like may also be used.

Carbamates of diamines may also be used in the practice of this invention. They are generally prepared by the reaction of carbon dioxide or a compound which liberates carbon dioxide with a diamine containing two amino hydrogens. Any of the diamines disclosed above may be used. Preferred diamine carbamates are ethylene diamine carbamate, 2-methylpiperazine carbamate, and hexamethylene diamine carbamate.

Substantially any of the prior art catalysts may be employed in preparing the isocyanate-terminated prepolymer. These include, for example, organic tin compounds and tertiary amines. Suitable organic tin compounds that may be used are those tin compounds having a tin to oxygen to carbon valence bond or a direct carbon to tin valence bond and at least one catalytically intensifying bond from the tin to halogen, oxygen, sulfur, nitrogen or phosphorus. A preferred organic tin compound is stannous octoate. For a more comprehensive understanding of the organic tin compounds that may be utilized, the disclosure thereof in U.S. Pat. No. 3,194,773 is herewith incorporated by reference. Examples of tertiary amines that may be used are N-methyl morpholine, trimethylamine, ethyl diethanolamine, tetramethylethylene diamine, dimethyl aminopropane, diethyl ethanolamine, and the like.

In a preferred embodiment of this invention, one mole of a blend of polyoxyethylene glycol and a block copolymer, prepared by the addition of ethylene oxide to polyoxypropylene glycol, is mixed and reacted with from about 1.4 to 2.2 moles of an organic polyisocyanate in the presence of a catalyst in the range of from about 0.005 to 0.3 weight percent of the blend at from about 60° C. to 120° C. for about 0.1 to 1.5 hours. The free isocyanate concentration of the mixture after this period will be from about 0.1 to 1.5 percent by weight of the prepolymer. The reaction mixture is then allowed to cool to room temperature and then granulated. The granulated or flaked prepolymer is left exposed to the atmosphere for at least 12 hours at about 40° F. to 110° F. and a relative humidity of 20 percent to 90 percent. At this stage, the isocyanate-terminated prepolymer is solid and water insoluble. One equivalent of the isocyanate-terminated prepolymer is then reacted with from about 0.2 to 10.0 equivalents of a diamine for about 1 to 5 minutes at about 65° C. to 180° C. The diamine utilized has a melting point below the temperature of the chain extension reaction. The resulting mixture is then allowed to cool to room temperature. Thereby, a water-soluble polymer is obtained as the product.

The prepolymer may be chain extended with the diamine by preparing a blend of these reactants and extruding the blend.

In some instances, a water solution of the hydrophilic polymer is desirable for use as a sizing bath for textiles, a water-soluble adhesive, as a temporary protective coating to be removed by washing from the surfaces of the protected items after use or in the preparation of cast films. To prepare a water solution of the hydrophilic polymer, the partially cured granulated or flaked prepolymer is dry blended with a diamine or diamine carbamate and the blend sifted into water heated to a temperature of 50° to 80° C. The solution is vigorously agitated during the addition. In general, from 0.5 to 1.5 hours is required for the preparation of the final solution of the polymer. The prepolymer and diamine or diamine carbamate may also be added to the water separately.

The following examples illustrate the practice of this invention, but are not to be considered as being unduly limitative thereof. All quantities of ingredients are in parts by weight unless otherwise specified.

The properties of the polymer films included in the examples were obtained using standard test methods known in the testing art. The tensile and yield strength, modulus, and elongation data of the following examples were obtained by the test methods of ASTM Designation D-2240-64-T.

EXAMPLE I

This example illustrates the preparation of an isocyanate-terminated prepolymer. A blend of 450 grams of polyoxyethylene glycol having a molecular weight of 6,000 and 60 grams of a block copolymer having a molecular weight of 6,500 and consisting of ethylene oxide units of about 80 percent by weight of the polymer prepared by the addition of ethylene oxide to polyoxypropylene glycol were introduced into a 1-liter flask equipped with a mechanical stirrer, thermometer and an outlet tube connected to a vacuum system. The system was heated for 2 hours at 110° to 120° C. with stirring and pulling a vacuum to remove moisture. Nitrogen was then fed into the flask to release the vacuum. The temperature of the mixture was adjusted to 80° C. and 20.9 grams of toluene diisocyanate were added. About 0.1 grams of stannous octoate catalyst was then added to the mixture. The ratio of NCO/OH in the mixture was 1.6/1. The temperature was maintained at about 75° to 80° C. with stirring for 0.5 hours at which time the NCO concentration was 0.75 percent.

Within 2 hours after the preparation of the isocyanate-terminated prepolymer, the prepolymer was granulated and allowed to age at 75° F. at 55 percent relative humidity for 1 day. The partially cured prepolymer was water insoluble and had a free NCO concentration of about 0.61 percent.

EXAMPLE II

This example illustrates the preparation by extrusion of a urethane-urea polymer from the isocyanate-terminated prepolymer of example I. About 8.4 grams of finely ground 2-methylpiperazine was blended with about 925 grams of prepolymer from example I. This blend was extruded at a temperature of about 90° to 110° C. The residence time in the extruder was a to 3 minutes. The polymer that was obtained was water soluble and formed films having the following physical properties:

|  | Ambient Conditions | After 48 hrs. at 85% R.H. |
| --- | --- | --- |
| Tensile, p.s.i. | 3,450 | 2,290 |
| Yield Point, p.s.i. | 845 | 980 |
| 300% Modulus, p.s.i. | 835 | 935 |
| 5% Modulus, p.s.i. | 1,115 | 990 |
| % Elongation | 1,020 | 955 |

EXAMPLE III

This example illustrates the preparation of an isocyanate-terminated prepolymer following the procedure of example I. A blend of 525 grams of polyoxyethylene glycol having a molecular weight of 6,000 and 70 grams of a block copolymer having a molecular weight of 6,500 and consisting of ethylene oxide units of about 80 percent by weight of the polymer prepared by the addition of ethylene oxide to polyoxypropylene glycol, were introduced into the 1-liter reaction flask. After the vacuum was released, the temperature of the mixture was adjusted to 80° C. and 30.1 grams of toluene diisocyanate were added. About 0.1 grams of stannous octoate catalyst was then added to the mixture. The ratio of NCO/OH in the mixture was 1.75/1. The temperature was maintained at about 75° C. to 90° C. with stirring for about 0.6 hours at which time the NCO concentration was 0.88 percent. One hour after the preparation of the isocyanate-terminated prepolymer, the prepolymer was granulated and allowed to age at 75° F. at 40 percent to 50 percent relative humidity for 3 days. The partially cured prepolymer was found to be water insoluble and had a free NCO concentration of 0.26 percent.

EXAMPLE IV

This example illustrates the preparation of urethane-urea polymers prepared from the isocyanate-terminated prepolymer of example III. About 300 grams of the prepolymer of example III were combined with about 2.4 grams of finely ground 2-methylpiperazine and extruded at a temperature of about 90° C. to 110° C. The residence time in the extruder was 2 to 3 minutes. The polymer that was obtained was soluble and formed films that had the following physical properties:

|  | Ambient Conditions | After 48 hrs. at 85% R.H. |
|---|---|---|
| Tensile, p.s.i. | 5,050 | 4,830 |
| Yield Point, p.s.i. | 1,570 | 1,375 |
| 300% Modulus, p.s.i. | 1,450 | 1,340 |
| 500% Modulus, p.s.i. | 1,760 | 1,940 |
| % Elongation | 1,100 | 1,020 |

EXAMPLE V

This example illustrates the preparation of an isocyanate-terminated prepolymer following the procedure of example I. A blend of 450 grams of a polyoxyethylene glycol having a molecular weight of 6,000 and 60 grams of a block copolymer, prepared by the addition of ethylene oxide to polyoxypropylene glycol, having a molecular weight of about 8,500 and an ethylene oxide unit content of 80 percent by weight of the copolymer, were introduced into the reaction flask. After release of the vacuum and adjusting the temperature to about 80° C. about 25 grams of toluene diisocyanate were added to the mixture. About 0.05 milliliter of stannous octoate catalyst was then added to the mixture. The temperature was maintained at 80° C. for about 0.5 hours at which time the NCO concentration was 0.90 percent. The prepolymer was then partially cured following the procedure utilized in example I and found to be water insoluble and had a free NCO concentration of 0.79 percent.

EXAMPLE VI

This example illustrates the preparation of a urethane-urea polymer from the isocyanate-terminated prepolymer of example V. Two batches of about 100 grams each of the prepolymer of example V were mixed with about 0.25 percent and 0.50 percent of finely ground 2-methylpiperazine, respectively, and each batch extruded at about 90° to 110° C. The residence time in the extruder was 2 to 3 minutes. The polymer that was obtained was water soluble and formed films that had the following physical properties:

|  | Tensile | Modulus 300% | Modulus 500% | Yield | Percent elongation |
|---|---|---|---|---|---|
| 0.25% 2-MP | 4,122 | 1,667 | 1,846 | 1,564 | 1,395 |
| 0.50% 2-MP | 4,353 | 1,712 | 2,023 | 1,824 | 1,021 |
|  | After 48 hrs. at 84% R.H. | | | | |
| 0.25% 2-MP | 4,046 | 1,659 | 1,998 | 1,492 | 1,008 |
| 0.50% 2-MP | 4,324 | 1,393 | 1,846 | 1,346 | 1,092 |

EXAMPLE VII

This example illustrates the preparation of a urethane-urea polymer solution in water from the isocyanate-terminated prepolymer of example III.

A flask containing 2,375 grams deionized water was heated to 60° C. The 125 grams of the prepolymer of example III was combined with 0.9 grams of 2-methylpiperazine carbamate and sifted into the vigorously stirred water. After stirring for 1 hour the prepolymer had completely reacted with the 2-methylpiperazine carbamate and was all in solution. The solution was next poured into trays and the water evaporated to obtain the polymer film. It had the following physical properties:

|  | Ambient Conditions | After 48 hrs. at 85% R.H. |
|---|---|---|
| Tensile, p.s.i. | 6,080 | 3,610 |
| Yield Point, p.s.i. | 1,470 | 800 |
| 300% Modulus, p.s.i. | 1,490 | 950 |
| 500% Modulus, p.s.i. | 2,175 | 1,300 |
| % Elongation | 1,020 | 1,000 |

EXAMPLE VIII

This example illustrates the preparation of a water-soluble urethane-urea by substituting a water-soluble polyoxyalkylene glycol reactant for the blend of a water-soluble polyoxyalkylene glycol and a block copolymer prepared by the addition of ethylene oxide to polyoxypropylene glycol, the reactant utilized in the preparation of the isocyanate-terminated reactant prepolymer required or providing the water-soluble urethane-urea polymer of this invention.

The procedure of example I was followed in the preparation of the prepolymer except for the deletion of the block copolymer and the addition of 20.9 grams of toluene diisocyanate. This partially cured prepolymer was utilized to prepare the water-soluble urethane-urea polymer of this invention by following the procedure of example II with the exception that 5.4 grams of 2-methylpiperazine carbamate was blended with the prepolymer in the extrusion operations. The physical properties of a film prepared from the extruded water-soluble polymer are scheduled below:

|  | Ambient Conditions | After 48 hrs. at 85% R.H. |
|---|---|---|
| Tensile, p.s.i. | 4,393 | 1,291 |
| Yield Point, p.s.i. | 1,589 | 565 |
| 300% Modulus, p.s.i. | 1,503 | 713 |
| 500% Modulus, p.s.i. | 1,808 | 1,176 |
| % Elongation | 1,355 | 548 |

From the above physical properties, it may be concluded that when the block copolymer is deleted in preparing the water-soluble urethane-urea polymers of this invention films prepared from the final polymer product suffer a severe degradation of physical properties upon exposure to humid atmospheres. The loss of tensile strength and related properties makes these polymers unsuitable for textile sizing and other operations conducted in humid atmospheres.

EXAMPLE IX

This example illustrates the preparation of a water-soluble urethane-urea polymer by deletion of the block copolymer required in the preparation of the isocyanate-terminated prepolymer reactant and the employment of 2-methylpiperazine as chain extender in the process of this invention.

3,039 grams of a polyoxyethylene glycol of 6,078 molecular weight were melted and poured into a flask equipped with a mechanical stirrer and an outlet tube connected to a vacuum pump. The system was heated for 2 hours at 110° to 115° C. with stirring and pulling a vacuum to remove moisture. Nitrogen was then fed into the flask to release the vacuum. 0.6 gram of stannous octoate was added. The temperature of the mixture was adjusted to 75° C., and then 139 grams of toluene diisocyanate were added. The ratio of NCO/OH in the mixture was 1.6/1. The temperature was maintained at between 70° and 80° C. for 0.5 hour, at which time the NCO concentration was 0.76 percent.

Within 6 hours after the preparation of the isocyanate-terminated prepolymer, the prepolymer was ground to a fine particle size and allowed to age at 75° F. and 55 percent relative humidity for 2 days. The partially cured prepolymer was found to be water insoluble and had an NCO concentration of 0.41 percent.

The partially cured prepolymer was mixed in an extruder with 2-methylpiperazine. The amount of 2-methylpiperazine used was 0.55 percent by weight of the prepolymer. This mixture was extruded at a temperature of 120° to 140° C. The residence time in the extruder was 2 to 3 minutes. The polymer that was obtained was water soluble and formed films that had a tensile strength of 4,700 p.s.i. and a break elongation of 864 percent.

When maintained for 2 days at 75° F. and 75 percent relative humidity, the film was found to have a tensile strength of 1,100 p.s.i.

The superiority, advantages and utility of the polymers of this present invention are readily demonstrated by comparison of their excellent physical properties included in the various examples of this application with the physical properties of the polymer of this example.

What is claimed is:

1. A water-soluble urethane-urea polymer resistant to moisture absorption in humid atmospheres prepared by
   I. reacting in the presence of a catalyst and in the absence of a solvent
      A. a blend of (1) a water-soluble polyoxyalkylene glycol and (2) a block copolymer prepared by the addition of ethylene oxide in the amount of at least 50 weight percent of the resulting block copolymer to a polyoxypropylene glycol in a weight ratio of polyoxyalkylene glycol to copolymer of from 3.0:1.0 to 10.0:1.0, with
      B. organic polyisocyanate at a temperature from about 60° to 120° C. wherein the ratio of OH groups to NCO groups is between 1.0:1.2 and 1.0:2.1 to form a prepolymer containing terminal unreacted isocyanate groups;
   II. subjecting the resulting isocyanate-terminated prepolymer to an atmosphere having a relative humidity of 20 percent to 90 percent at a temperature of about 40° to 110° F. until at least 20 percent of the free isocyanate groups of the prepolymer have been reacted to obtain partial curing; and
   III. reacting at a temperature of about 40° to 180° C. the resulting isocyanate-terminated prepolymer with an organic diamine or diamine carbamate wherein the ratio of isocyanate groups in the prepolymer to amine groups in the organic diamine is from about 1.0:0.1 to 1.0:2.0.

2. The urethane-urea polymer of claim 1 wherein the ethylene oxide groups of the block copolymer are from about 50 percent to 80 percent by weight of the block copolymer.

3. The urethane-urea polymer of claim 1 wherein the polyoxyalkylene glycol is polyoxyethylene glycol.

4. The urethane-urea polymer of claim 3 wherein the molecular weight of the polyoxyethylene glycol is from about 3,000 to about 12,000.

5. The urethane-urea polymer of claim 1 wherein the catalyst is a tertiary amine or an organic tin compound.

6. The urethane-urea polymer of claim 4 wherein the organic tin compound is stannous octoate.

7. The urethane-urea polymer of claim 1 wherein the diamine is 2-methylpiperazine, ethylene diamine or N(2-hydroxypropyl)ethylene diamine.

8. The urethane-urea polymer of claim 1 wherein the diamine carbamate is 2-methylpiperazine carbamate, ethylene diamine carbamate, or hexamethylene diamine carbamate.

9. The urethane-urea polymer of claim 1 wherein the organic polyisocyanate is selected from the group consisting of toluene diisocyanate, tetramethylene diisocyanate, 4,4'-diphenyl methane diisocyanate, 1,5-naphthalene diisocyanate, m-xylylene diisocyanate or methyl cyclohexane diisocyanate.

10. The urethane-urea polymer of claim 1 wherein the molecular weight of the block copolymer is about 4,700 to about 16,250.

11. The urethane-urea polymer of claim 1 wherein the prepolymer is reacted with the diamine at a temperature of about 65° to 180° C.

12. A process for preparation of a water-soluble urethane-urea polymer resistant to moisture absorption in humid atmospheres comprising the steps of:
   A. reacting in the presence of a catalyst suitable for the preparation of a urethane and in the absence of a solvent, a blend of (2) a polyoxyalkylene glycol and (2) a block copolymer, prepared by the addition of ethylene oxide in the amount of at least 50 weight percent of the resulting block copolymer to polyoxypropylene glycol in a weight ratio of polyoxyalkylene glycol to copolymer of from 3.0:1.0 to 10.0:1.0 with an organic polyisocyanate at a temperature of about 60° C. to 120° C. wherein the ratio of OH groups to NCO groups is between 1.0:1.2 and 1.0:2.1 to form a prepolymer containing terminal unreacted isocyanate groups;
   B. subjecting the prepolymer to an atmosphere having a relative humidity of 20 percent to 90 percent at a temperature of about 40° to 110° F. until at least 20 percent of the free isocyanate groups of the prepolymer have been reacted to obtain partial curing, and
   C. reacting the partially cured prepolymer with a diamine or diamine carbamate wherein the ratio of isocyanate groups in the prepolymer to amine groups in the organic diamine is from about 1.0:0.1 to 1.0:2.0 at a temperature of about 40° to 180° C. to form a urethane-urea polymer.

13. The process of claim 12 wherein the ethylene oxide groups of the block copolymer are from about 50 percent to 80 percent by weight of the block copolymer.

14. The process of claim 12 wherein the catalyst is a tertiary amine or an organic tin compound.

15. The process of claim 11 wherein the organic tin compound is stannous octoate.

16. The process of claim 12 wherein the diamine is 2-methylpiperazine, ethylene diamine or N(2-hydroxypropyl)ethylene diamine.

17. The process of claim 12 wherein the diamine carbamate is 2-methylpiperazine carbamate, ethylene diamine carbamate or hexamethylene diamine carbamate.

18. The process of claim 12 wherein the organic polyisocyanate is selected from the group consisting of toluene diisocyanate, tetramethylene diisocyanate, 4,4'-diphenyl methane diisocyanate, 1,5-naphthalene diisocyanate, m-xylylene diisocyanate or methyl cyclohexane diisocyanate.

19. The process of claim 12 wherein the polyoxyalkylene glycol is polyoxyethylene glycol.

20. The process of claim 19 wherein the molecular weight of the polyoxyethylene glycol is from about 3,000 to about 12,000.

21. The process of claim 12 wherein the diamine or diamine carbamate and the prepolymer are reacted by preparing a blend of the prepolymer and diamine or diamine carbamate and extruding the blend at a temperature of about 90° to 110° C.

22. The process of claim 12 wherein the diamine or diamine carbamate and the prepolymer are reacted by preparing a blend of the prepolymer and diamine or diamine carbamate and dissolving the blend in water at a temperature of about 40° to 90° C.

* * * * *